United States Patent [19]

Bricker et al.

[11] Patent Number: 4,891,054
[45] Date of Patent: Jan. 2, 1990

[54] METHOD FOR CUTTING HOT GLASS

[75] Inventors: Jack A. Bricker, Tarentum; Earl L. May, Irwin, both of Pa.; Donald P. Michelotti, Rochester Hills, Mich.; John R. Dahlberg, Jeannette, Pa.; James J. Oravitz, Jr., Cheswick, Pa.; William R. Siskos, Delmont, Pa.

[73] Assignee: PPG Industries, Inc., Pittsburgh, Pa.

[21] Appl. No.: 292,083

[22] Filed: Dec. 30, 1988

[51] Int. Cl.$^4$ ............................................. C03B 21/00
[52] U.S. Cl. ........................................ 65/105; 65/97; 65/112
[58] Field of Search ................ 65/97, 105, 112, 113

[56] References Cited

U.S. PATENT DOCUMENTS

| 1,333,229 | 5/1920 | Slingluff . | |
|---|---|---|---|
| 1,560,077 | 1/1922 | Gelstharp | 65/175 |
| 3,124,444 | 5/1960 | Ritter Jr. et al. | 65/25 |
| 3,454,219 | 10/1966 | Curtze et al. | 225/1 |
| 3,754,884 | 8/1973 | McDavid et al. | 65/97 |
| 3,756,482 | 9/1973 | De Torre | 225/2 |
| 3,843,346 | 3/1974 | Edge et al. | 65/65 |
| 3,865,293 | 2/1975 | Ernsberger et al. | 225/2 |
| 3,865,294 | 2/1975 | Ernsberger et al. | 225/2 |
| 3,875,766 | 4/1975 | French | 65/97 |
| 3,928,013 | 12/1975 | French | 65/97 |
| 3,934,995 | 1/1976 | French | 65/97 |
| 4,057,184 | 11/1977 | Michalik | 225/2 |
| 4,466,562 | 8/1984 | DeTorre | 225/2 |
| 4,749,400 | 6/1988 | Mouly et al. | 65/97 |

FOREIGN PATENT DOCUMENTS 2567872  7/1984  France .

Primary Examiner—Arthur Kellogg
Attorney, Agent, or Firm—Andrew C. Siminerio

[57] ABSTRACT

A glass sheet is cut while at a temperature at about its annealing point temperature by scoring the glass sheet along a line of cut and imparting a bending moment to the glass along the scored line to open the glass. The glass sheet remains at its elevated temperature throughout the cutting operation to reduce or eliminate additional heating required for subsequent processing.

11 Claims, No Drawings 4,891,054

METHOD FOR CUTTING HOT GLASS

BACKGROUND OF THE INVENTION

Field of the Invention

This invention relates to cutting of glass, and more particularly, to the cutting of a heated glass ribbon at temperatures at about or greater than its annealing point temperature while maintaining desired optics in the cut glass sheets.

Technical Considerations

The fabrication of flat or bent glass products conventionally requires two separate and distinct processes: primary processing and secondary processing.

The primary processing includes forming a glass ribbon from molten glass by either floating the molten glass on a tin bath, for example, as disclosed in U.S. Pat. No. 3,843,346 to Edge, et al., or pulling a sheet of glass from a molten glass bath, for example, as disclosed in U.S. Pat. No. 1,339,229 to Slingluff. After forming the glass ribbon, the ribbon is typically conveyed into an annealing zone where it is controllably cooled to a temperature below its strain point. After cooling, the ribbon is cut into individual glass sheets for subsequent secondary processing.

Second processing may include any of a number of additional glass sheet processing procedures. For example, glass sheets may be cut into smaller, more easily handleable sheets prior to cutting the glass to its final shape. The final shape may be rectangular, as in desk tops, glazing units, etc., or may be more complex as in special glazing designs or automotive windows. The secondary processing may also include a heating operation, for example, as is required to shape the glass to a contoured configuration. In a shaping operating, the cut glass is reheated to its heat deformable temperature, for example, approximately 1150° F. to 1250° F. (621° C. to 677° C.) for typical soda/lime/silica glass.

After the cold and/or hot processing of the glass, the glass may be heat strengthened. In the case of room temperature glass, the glass sheet is reheated to a temperature above its annealing range, and then rapidly cooled through the annealing range to below its strain point temperature, to impart a temper to the glass. In the case of bent glass, immediately after the bending operation, the glass temperature is generally already above the annealing range so that the glass can be immediately cooled to impart a temper.

The present practice of fabricating glass products with acceptable optical qualities such as windows, mirror, and the like, requires the practice of the primary and secondary processes. It is apparent that there would be a significant cost savings if the primary or secondary process could be modified, or the two processes could be integrated into a single process, so as to eliminate certain steps. For example, cutting the glass while it is still hot, so as to reduce the amount of reheating required to subsequent processing of the cut glass sheet.

Patents of Interest

U.S. Pat. No. 1,560,077 to Gelstharp teaches the severing of a glass ribbon in a sheet glass operation while the ribbon is still in a plastic state. A cutting wheel mounted on a carriage and moveable along a direction transverse to the movement of the ribbon is used to severe the glass ribbon while it is still in a plastic state. The pressure on the cutting wheel is sufficient to cut entirely through the glass so that no further cutting or breaking is necessary.

U.S. Pat. No. 3,124,444 to Ritter, Jr. et al. teaches a method for continuously removing the marginal edge or border portions of a moving ribbon of glass while it is in a plastic condition. A pair of circular cutting discs are arranged at the edge of the ribbon so that the ribbon passes therebetween and the edge of the ribbon is cut from the remainder of the ribbon.

U.S. Pat. No. 3,454,219 to Curtze et al. teaches a method of severing a scored glass sheet by using two pairs of supports to provide a uniform bending moment about a scored line.

U.S. Pat. No. 3,754,884 to McDavid et al. teaches a glass cutting method and apparatus wherein the glass ribbon, after it is formed from molten glass material, is brought to a temperature corresponding to the strain point of the glass and cut while at this temperature.

U.S. Pat. No. 3,756,482 to De Toree teaches a method of removing trim from a scored glass pattern. Heat is applied along the score to propagate the score through a portion of the glass thickness prior to final breakout of the glass pattern.

U.S. Pat. Nos. 3,865,293 and 3,865,294 to Ernsberger et al. and 4,057,184 to Michalik teach subsurface cracking of flat glass using large diameter scoring wheels at greater-than-usual applied pressure. Application of a bending moment about the crack propagates a fracture in the glass.

U.S. Pat. No. 3,875,776 to French teaches a method of cutting glass sheets directly from a ribbon by subjecting the surfaces of the glass to an initial period of rapid cooling, so as to induce a substantial temperature differential between the interior portions of the glass and the surface of the glass and forming a transverse score along the rapidly cooled surface.

U.S. Pat. No. 3,928,013 to French teaches a method of cutting hot glass at or near its annealing point by drawing a scoring implement across the glass surface and continuously supplying liquid to the score at quantities sufficient to allow the liquid to flow or to be drawn into the minute fissures formed by the scoring implement. The liquid prevents the fissures from healing themselves and perpetuates the fissures for a sufficient time period to permit the glass to be fractured along the scored line by applying bending stresses along the line.

U.S. Pat. No. 3,934,995 to French teaches a method of cutting discreet glass sheets from a glass ribbon by subjecting the glass surface to a moderate controlled quenching influence sufficient to place the surface area in slight tension so that the temperature of the surface area is in the range of about 50° F. (10° C.) or less than the maximum temperature within the glass ribbon and scoring a line across the chilled portion. The glass is then fractured along the scored line.

U.S. Pat. No. 4,466,562 to De Torre teaches cutting glass by imposing a subsurface score beneath one major surface of the glass and an open score imposed on the opposite major surface, aligned with the subsurface score. A bending moment is applied about the scores to propogate the open score toward the subsurface score to sever the glass and provide a smooth cut edge.

SUMMARY OF THE INVENTION

The present invention teaches the cutting of hot glass at a temperature at or greater than its annealing point temperature while maintaining the optical quality of the glass. The glass is cut at this elevated temperatures to minimize any additional reheating for subsequent heat processing of the glass, for example, bending and/or tempering.

DETAILED DESCRIPTION OF THE INVENTION

In describing the present invention, reference will be made to certain properties and reference temperatures of the glass. "Annealing point" and "strain point" are defined as the temperatures that correspond to either a specific rate of elongation of a glass fiber when measured by ASTM Measure C336 or a specific rate of midpoint deflection of a glass beam when measured by ASTM Method C598. At the annealing point, internal stresses are substantially relieved in a matter of minutes. At the strain point, internal stresses are substantially relieved in a matter of hours. The range of temperatures between the annealing point and the strain point is called the annealing range. During heat processing of glass, its temperature is lowered slowly (annealing) or quickly (tempering) through the annealing range. For typical soda/lime/silica float glass, the annealing point temperature is generally within the range of about 1,000° F.–1,040° F. (538° C. to 560° C.), the strain point temperature generally within the range of about 925° F. to 970° F. (496° C.–521° C.), and the annealing range is about 925° F. to 1,040° F. (496° C. to 560° C.). "Float glass optical quality" can be characterized by the optical power of the glass' dominant transmitted defects. These defects, for float glass in the form of surface irregularities, generally have a wavelength in the range of approximately 0.50 inches to 2 inches (1.27 cm. to 5.08 cm.) and that optical power on the order of approximately 35 millidiopters or less.

"Scoring" as used herein is defined as creating a fissure on or in the surface of the glass along a predetermined path and "opening" is defined as propagating the fissure through the glass thickness, for example by mechanical or thermal means as taught in U.S. Pat. Nos. 3,756,482 and 4,466,562 to De Torre, which teachings are hereby incorporated by reference. Cutting of glass is typically performed while the glass is below its annealing point temperature, and more particularly, at room temperature. Cutting at these temperatures can cause defects in the edge, such as glass chipping, which reduces the edge strength and can cause venting. These defects can be removed by seaming or grinding the glass periphery to remove a small portion of the damaged cut edge.

When the glass is at an elevated temperature, and more particularly, at its annealing point temperature, strains induced into the glass from external forces are quickly relieved. As a result, when glass is scored and opened at about the annealing point temperature, any defects along the edge, which induce an internal strain in the glass, are relieved. Furthermore, glass flow at this temperature will tend to heal any defects along the cut edge. Cutting the glass at about its annealing point temperature also eliminates the need to reduce the glass temperature to cut it and reduces subsequent reheating of the glass for further heat processing, such as tempering, annealing or glass sheet bending. This is particularly advantageous when the glass to be cut is coming directly from a sheet or float glass operation, where the glass is delivered at a temperature above its annealing point temperature.

In order to test the sensitivity of glass scoring at elevated temperatures, bench scale tests were conducted on ⅛"×6"×9" (0.32 cm×15.24 cm×22.86 cm) float glass samples between the temperatures of 600° F. to 1,300° F. (316° C. to 704° C.). Scoring was done manually using 7/32" (0.56 cm) diameter, tungsten carbide cutting wheel with a 120° cutting angle. Opening was accomplished using standard, preheated cut running pliers. The results of the tests indicated that the glass could be scored throughout the entire temperature range. One difference noted in the scoring operation was that a higher scoring force was required as the hot glass temperature increased. The results also show that support of the glass under the scoring wheel is important. Scoring without a constant support under the glass, and preferably under the line of score, may cause damage and/or deformation to the scored surface. It was observed that starting at about 1,100° F. (593° C.), the back surface of the heated glass sheet started to pick up impressions of the support. At about 1,250° F. (677° C.) the force of the scoring wheel began to dimple the top surface.

Opening of the glass along the scored lined by applying a moment about the scored line was achieved at up to 1,300° F. (704° C.), at which point the glass began to bend about the score. Furthermore, it is found that at glass temperature of approximately 1,125° F. (607° C.), due to viscosity of the glass, the mode of opening the glass along the score must change from a gradually applied opening moment to a rapidly applied moment in order to get a sharp, well defined edge. During testing, it was observed that the score would open along a portion of its length and then bend about the score. It is believed that this is due to a thermal gradient along the length of the score, wherein the front portion of the score was at a temperature of approximately 1,250° F. (607° C.) while the back portion of the score was at a temperature of approximately 1,300° F. (704° C.).

Further testing was conducted on 4 millimeter float glass in the narrower temperature range of 1,000° F. (537° C.) to 1,160° F. (627° C.). The testing included both off-line and on-line testing.

The off-line testing was conducted by heating a glass plate to above its annealing point temperature and positioning the plate over a snap roll, which included a conveyor roll mounted on a base so that the roll could be raised or lowered via an air cylinder. After a cutting head was activated to score the glass, the glass was opened along the score by the snap roll lifting the glass in the vicinity of the score to induce a bending moment and propagate the score through the glass. Initial tests were conducted using cutting wheels with diameters of 1½", ½", ⅜" and 3/16" (3.81 cm, 1.27 cm, 0.95 cm, and 0.48 cm). The 1½" diameter wheel was 304 stainless steel and had a 120° cutting angle. The ½", ⅜" and 3/16" wheels were tungsten carbide and has a cutting angle of 158.7°, 160°, and 161°, respectively. The scoring speed was in the range of 5 to 10 inches per sec. (12.7 to 25.4 cm per sec.). The 1½" (3.81 cm) diameter wheel did not produce any detectable scoring action with a loading of up to 30 pounds (13.6 Kg). With the ½" and ⅜" (1.27 cm and 0.95 cm) diameter wheel, scoring was achieved but only under similar high loading conditions. The scores produced by these wheels were intermittent and could not be reliably opened. It is believed that reliable scoring could be achieved with the 1½", ½", and ⅜" diameter wheels if higher loads are applied during scoring. Scoring with a 3/16" (0.43 cm) diameter wheel was achieved with a loading in the range of about 10 to 22 pounds (4.5 to 10 Kg). Loading in the range of about 10 to 15 (4.5 to 6.8 Kg) pounds produced reliable continuous scores that were readily opened by the snap roll. Loading in the range of about 15 to 22 (6.8 to 10 Kg) pounds produced scores that often opened spontaneously without the use of a snap roll. This initial testing was conducted with glass temperatures ranging from 1,000° F. (538° C.) to 1,050° F. (566° C.). It is believed that the more consistent scoring using the 3/16" diameter wheel was due in part to the higher concentration of the load at the point of contact with the glass sheet that is inherent with a smaller diameter wheel as compared to a larger diameter wheel.

Additional hot scoring tests where conducted using a tungsten carbide 3/16" (0.48 cm) diameter wheel with a 134° cutting angle on glass at temperatures ranging from 1,000° F. to 1,160° F. (538° C. to 627° C.). Wheel loading ranged from about 10 to 22 pounds (4.5 to 10 kg) and scoring speed was about 5 to 10 inches/second. Little difference was noted in scoring and opening up to 1,120° F. (604° C.). Scores were made with no apparent surface deformation and opened readily by the snap roll. At temperatures above 1,120° F. (604° C.) to the maximum tested temperature of 1,160° F. (627° C.) some minor deformation occurred in the glass surface at the point of initial contact with the cutting wheel. Deformation at this point of impact was more apparent as temperature was increased. There was no deformation along the remaining portion of the score line.

Scores were opened reliably up to 1,120° F. (604° C.) using the snap roll. Glass above this temperature was noticeably more plastic and more sensitive to the rate at which the opening moment was applied. At the temperatures between 1,150° F. and 1,160° F. (621° C. to 627° C.) it was observed that an impulse or rapidly applied moment was required to produce satisfactory opening of the score with minimal plate deformation. This was accomplished by increasing the speed at which the snap roll lifted the glass sheet.

Edge quality of the glass scored by the 3/16" diameter wheel was good. In most cases, edge quality comparable to cold cutting was achieved. However, in some cases, under cutter head loading in the range of 15 to 22 pounds (6.8 to 10 Kg), edge chipping was apparent.

On-line testing was conducted between the bath lift-out section and the lehr portions of a float glass forming operation similar to that disclosured in U.S. Pat. No. 3,843,346 to Edge et al. which teachings are hereby incorporated by reference. In the particular cutting assembly used during testing, a cutting bridge was mounted over the float glass ribbon at a point immediately downstream from the last bath lift-out roll. A snap roll assembly was mounted under the ribbon and normal to glass ribbon flow approximately 2 feet (61 cm) downstream of the cutting bridge. Ribbon temperatures measured during the testing ranged from 1,025° F. to 1,050° F. (552° C. to 566° C.) and the glass thickness was approximately 4½ millimeters. The scoring wheel was a 5/32" (0.40) diameter tungsten carbide wheel having a 134° cutting angle. The glass ribbon was scored at a speed of about 15 to 20 inches/sec (38.1 to 50.8 cm/sec).

The glass ribbon was easily scored with cutting loads ranging from about 8.5 to 11 pounds (3.9 to 5 kg) and opened by the snap roll. As in the off-line tests, a few scores opened spontaneously. It was noted that scores made 4 to 6 feet (1.22 to 1.83 m) apart could not be opened reliably with the snap roll alone because the lifting action of the snap roll did not generate the necessary moment to open the glass along the score line. A short restraining bar was mounted over the edge of the glass ribbon about 8 inches (20.32 cm) upstream from the snap roll to limit the upward movement of the glass and apply additional bending moment during snapping to open the score.

The quality of the cut edge was comparable to that obtained in off-line testing.

The testing verifies that flat glass can be cut by a surface scoring and opening operation at temperatures up to and exceeding its annealing point temperature with edge quality comparable to that of cutting the glass at lower temperatures. As a result, it would be appreciated by one skilled in the art that a heated glass sheet and in particular, a glass sheet being delivered directly from a flat glass forming operation, can be cut to size and shape while still at an elevated temperature and immediately advanced to further processing stations that require an elevated glass temperature, with minimal additional heating to the glass while maintaining its optical qualities during its cutting and subsequent handling.

It would be obvious to those skilled in the art that other opening techniques may be used to propagate the score through the glass thickness. For example, the scored line can be cooled to establish a temperature gradient as disclosed in U.S. Pat. No. 3,754,884 which teachings are hereby incorporated by reference. However, it should be noted that lowering the glass temperature along the edge reduces its ability to relieve internal stresses and heal edge defects.

The form of the invention described in this disclosure represents an illustrative embodiment thereof. It is understood that various changes may be made without departing from the teachings of the invention defined by the claimed subject matter which follows.

We claim:

1. A method of cutting a glass sheet along a desire line of cut comprising:
   providing a portion of a glass sheet, including a desired line of cut, at a temperature at least about its annealing point temperature;
   scoring a surface of said portion of said glass sheet along said desired line of cut; and
   opening said score through the glass sheet thickness, while;

2. The method as in claim 1 wherein said providing step includes heating said glass portion to a temperature substantially at about or above said annealing point temperature and between approximately 1000° F. and 1300° F.
   maintaining said portion of said glass sheet substantially at about said annealing point temperature but below the softening point temperature during said scoring and opening steps.

3. The method as in claim 2 wherein said heating step includes heating said glass portion to a temperature between approximately 1,000° F. and 1,160° F.

4. The method as in claim 3 wherein said opening step includes applying a bending moment to said glass portion along said line of cut.

5. The method as in claim 4 further including the step of heating said entire glass sheet to about its annealing point temperature prior to said scoring and opening steps and said maintaining step including maintaining said entire glass sheet at said annealing point temperature during said scoring and opening steps.

6. The method as in claim 4 wherein said providing step including providing an advancing continuous glass ribbon and said maintaining step includes maintaining the temperature of said glass ribbon at a temperature at about its annealing point temperature during said scoring and opening steps.

7. The method as in claim 6 further including the step of maintaining the optical properties of said glass during said cutting.

8. The method as in claim 1 wherein said opening step includes applying a bending moment to said glass portion along said line of cut.

9. The method as in claim 1 wherein said providing step includes heating said entire glass sheet to substantially about or above its annealing point temperature prior to said scoring and opening steps and said maintaining step includes maintaining said entire glass sheet substantially at about or above said annealing point temperature during said scoring and opening steps.

10. The method as in claim 1 wherein said providing step includes providing an advancing continuous glass ribbon and said maintaining step includes maintaining the temperature of said glass ribbon at a temperature substantially at about or above its annealing point temperature during said scoring and opening step.

11. The method as in claim 1 further including the step of maintaining the optical properties of said glass portion during said cutting.

* * * * *

UNITED STATES PATENT AND TRADEMARK OFFICE
CERTIFICATE OF CORRECTION

PATENT NO. : 4,891,054

DATED : January 2, 1990

INVENTOR(S) : Jack A. Bricker et al.

It is certified that error appears in the above-identified patent and that said Letters Patent is hereby corrected as shown below:

Claim 1, line 9, after "while" insert --maintaining said portion of said glass sheet substantially at about or above said annealing point temperature but below the softening point temperature during said scoring and opening steps.--

Claim 2, lines 6 through 9, delete "maintaining said portion of said glass sheet substantially at about said annealing point temperature but below the softening point temperature during said scoring and opening steps."

Claim 6, line 2, delete "including" and insert --includes--.

Signed and Sealed this

Nineteenth Day of February, 1991

Attest:

HARRY F. MANBECK, JR.

*Attesting Officer*          *Commissioner of Patents and Trademarks*